2,748,110

THIOURETHANES OF CELLULOSE ETHERS

Arthur L. Allewelt, West Chester, Pa., assignor to American Viscose Corporation, Philadelphia, Pa., a corporation of Delaware No Drawing. Application April 1, 1952,
Serial No. 279,921

8 Claims. (Cl. 260—216)

This invention relates to thiourethanes of substituted-ethyl celluloses and to compositions and molded and extruded articles comprising them. This case is related to Serial No. 353,901, filed May 18, 1953, same inventor.

The new ethers of the invention result from the interaction of the selected cellulose thiourethane with an acrylic acid derivative of the formula $$CH_2=CHX$$ 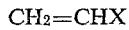

in which X is the cyano group or the group CONYY' in which Y and Y' represent hydrogen or alkyl radicals containing from 1 to 3 carbon atoms, whereby the cyanoethyl, amidoethyl, or alkyl-substituted amidoethyl ether is formed by the 1,4 addition of the acrylic acid derivative to the cellulose portion of the cellulose thiourethane.

The products of the reaction between the cellulose thiourethane and acrylic acid derivative may be represented by the formula

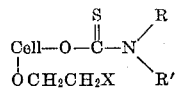

in which cell— represents the cellulose molecule, X represents one of the groups set forth above, and R and R' each represent hydrogen, a saturated or unsaturated hydrocarbon radical containing from 1 to 12 carbon atoms, an alicyclic or hydrocarbon-substituted alicyclic radical comprising a single 4- to 6-membered carbocyclic ring and having a total of not more than twelve carbon atoms, a heterocyclic or hydrocarbon-substituted heterocyclic radical comprising a single 5- or 6-membered ring and having a total of not more than twelve carbon atoms, an aryl radical of the benzene series, or in aryl radical of the benzene series having hydrocarbon groups containing a total of not more than six carbon atoms attached to the benzene ring, R and R' being the same or different.

Representative compounds within the scope of the invention include the cyanoethyl-, 2-amidoethyl, N-alkyl-2-amidoethyl, and N,N-dialkyl-2-amidoethyl ethers of cellulose thiourethanes in which the thiourethane group is one of the following:

Thiourethane
Phenylthiourethane
Phenylethylthiourethane
Isopropylthiourethane
Amylthiourethane
Benzylthiourethane
Cyclohexylthiourethane
Octylthiourethane
Dibenzylthiourethane
Dibutylthiourethane
Diethylthiourethane
Pyridylthiourethane
Ethylthiourethane
Allylthiourethane
Methallylthiourethane
Pyrrolylthiourethane
Cyclobutylthiourethane The cellulose thiourethanes which are reacted with the acrylic acid derivative to produce the ethers of the invention may be prepared by any suitable method. They may result from the action of a primary or secondary amine on a xantho fatty acid obtained by reacting a cellulose xanthate with a monohalogenated acid, such as chloracetic acid. Preferably, however, the cellulose thiourethane is a colorless product obtained by reacting viscose with a salt of a di- or tri-valent metal, such as zinc sulfate, to form a metal complex which is then reacted with the primary or secondary amine, as described in my pending application Serial No. 65,742 filed December 16, 1948, now Patent No. 2,705,231. In the preferred embodiment, the ratio of thiourethane groups to anhydroglucose units is from 1:2 to 1:10. Preferably, also, the cellulose thiourethane is soluble in dilute aqueous alkaline solution, and the reaction thereof with the acrylic derivative is carried out in an aqueous alkaline solution at temperatures below the polymerization temperature for the acrylic derivative.

Since the cyano-, amido-, and alkyl-substituted amido groups are hydrolyzable to the carboxyl group under alkaline conditions, the concentration of alkali in the reacting solution must be carefully controlled if partial or complete hydrolysis of those groups is to be avoided. In accordance with this invention the cellulose thiourethane and acrylic derivative are reacted in an aqueous solution of 1 to 4%, most desirably 2 to 3% of an alkali metal hydroxide such as sodium, lithium, or potassium hydroxide at a temperature varying inversely with the alkali concentration between 45 and 15° C., preferably 35 and 25° C., for a time varying with the alkali concentration and temperature between 2 and 8 hours, most desirably 4 and 6 hours, using from 10 to 55, preferably from 25 to 50 moles of acrylic derivative to one mole of cellulose thiourethane. Under these conditions, ethers in which the ratio of cyanoethyl-, 2-amidoethyl-, or alkyl-substituted 2-amidoethyl groups to anhydroglucose units is from 0.75:1 to 1.75:1 are obtained.

The thiourethanes of the cellulose ethers may be isolated from the reaction mass by neutralizing the alkali or by pouring the reaction solution into a precipitating liquid and occur as powdery or fibrous solids which are colorless or substantially colorless.

The new products are characterized by excellent receptivity for both the acid wool and cellulose acetate type dyestuffs and exhibit plastic properties. They may be extruded, as such or in mixtures with other plastic materials, to form fibers, films, tapes, tubes, ribbons, rods or other shaped articles which can be dyed very satisfactorily to deep fast shades under conventional wool-dyeing conditions. Thus, the cyanoethyl-, and amido- or alkyl-substituted amidoethyl-cellulose thiourethanes may be heated, alone or in mixtures with other plastic material, to obtain a hot melt which can be extruded to form filaments, yarn, or unsupported films, or to provide a suitable substrate with a coating or film. For instance, the ethers may be melted in a heated cylinder or the like and pumped through a spinneret or other extruding device, or they may be fed into a conventional screw mixer-extruder and extruded as a cylindrical rod which is broken into small pieces and fed into a screw-extruder in which it is melted and forced through a spinneret to form filaments or through an adjustable slit-like orifice in the manner customarily employed in the continuous manufacture of pellicles or films.

The products of the invention are soluble in dimethyl-formamide and dimethylacetamide, and those in which the ratio of substituted-ethyl groups to anhydroglucose units is between 1:1 and 1.75:1 are also generally soluble in acetone. The thiourethane ethers may be dissolved in the solvents therefor and spun into filaments or yarns by the known wet- or dry-spinning processes. Or the solutions may be cast into films, used as coating compositions, as adhesives, or for laminating similar or dissimilar surfaces. The new ethers may also be swollen or plasticized by means of acetone, dimethylformamide or dimethylacetamide to obtain plastic masses or "solid solutions" which may be extruded or molded, by controlling the amount of solvent used.

The ethers may be molded by compression or injection molding techniques, with or without the addition of molding adjuvants including fillers, plasticizing agents, dyes, pigments, special effect materials, mold lubricants, etc., and with or without preliminary shaping to convenient pellet form. Massive molded articles of diverse size and cross-section may be obtained and dyed with an acid dye under usual wool-dyeing conditions or with a cellulose acetate ("dispersol") type dye.

Another important use for the new thiourethanes of cellulose ethers is as modifying or blending agents for plastic materials to impart dye receptivity to shaped articles formed from the blends. The ethers are compatible with such plastic fiber-forming and moldable materials as cellulose acetate and thermoplastic resins, and may be blended with those base materials. Thus, a thiourethane of a cellulose ether within the scope of the invention may be mixed with commercial cellulose acetate and the mixture may be dissolved in a solvent for the ester and ether, or a thiourethane of the cellulose ether may be added to a "dope" comprising the cellulose acetate and a solvent for the ester and the thiourethane of the ether, prior to spinning, casing or otherwise shaping the dope. Dimethylformamide and dimethylacetamide, in which the ether-thiourethanes are soluble are also solvents for commercial cellulose acetate, and those solvents may be used in preparing spinning or casting solutions or "dopes" of the blends. When the solvent for the cellulose acetate is acetone, the acetone-soluble thiourethanes of the cellulose ethers are used in preparing the blends.

The thiourethanes of the cellulose ethers may also be mixed with natural or synthetic thermoplastic resins and extruded or molded by known methods. The components of these compositions may be mixed in solution and extruded or the dry, finely divided ingredients may be intimately mixed, for example in a Banbury mixer or on milling rolls, and dissolved in a suitable solvent. Or the dry mixture may be molded by compression or injection molding methods.

In molding the thiourethanes of the cellulose ethers or mixtures thereof with other plastic materials various molding adjuvants may be introduced into the molding composition, and when blends or mixtures of the cellulose ether thiourethanes with other plastic materials are used, the adjuvant, which may be a filler, plasticizer, mold lubricant, and/or special effect material, may be mixed with either of the primary components before they are mixed together or conjointly with compounding thereof.

Fillers which may be used in conjunction with molding compositions comprising the thiourethanes of the cellulose ethers include alpha-cellulose, wood flour, walnut shell flour, asbestos in the form of a powder or long or short fibers, finely divided silicon carbide, carbon black, diatomaceous earth, slate dust, powdered rutile, powdered or flake mica, powdered quartz, fibers and cloth cuttings (e. g. fibers or cloth cuttings of silk, rayon, wool, linen, cotton, nylon, glass, or polymeric or copolymeric acrylonitrile), ground cork, sand, etc.

Useful plasticizing agents include phthalic acid esters such as the dimethyl, diethyl, dimethyl glycol, diethyl glycol, dibutyl glycol and dioctyl phthalates, triethyl citrate, triacetin, benzyl benzoate and other known plasticizers for cellulose acetate and the synthetic thermoplastic resins.

As mold lubricants there may be used zinc stearate, calcium stearate, mixtures thereof, or natural or synthetic waxes.

Many thermoplastic or initially thermoplastic resins are compatible with and may be blended with the thiourethanes of cellulose ethers of this invention, including the polyamides such as nylon, and polyesters, particularly polymethylene terephthalates, and the synthetic thermoplastic resins obtained by the polymerization or interpolymerization of one or more polymerizable monoethylenically unsaturated monomers. Examples of these resins are polystyrene, polyethylene, polymethacrylate, polyvinyl chloride, polyvinylidene chloride, copolymers of vinyl chloride and vinyl acetate, and copolymers of vinyl chloride and vinylidene chloride (e. g., the product available commercially under the tradename "Saran").

A specific group of synthetic thermoplastic resinous materials which may be blended with and modified by the thiourethanes of celulose ethers are those acrylonitrile polymers containing, by weight in the polymer molecule, at least 50% of acrylonitrile. The polymer may be polyacrylonitrile or a copolymer of acrylonitrile with at least one other monoethylenically unsaturated monomer which is copolymerizable with acrylonitrile.

Monomers which may be copolymerized with acrylonitrile to produce binary or ternary copolymers for blending with the thiourethanes of the cellulose ethers include: acrylic, alpha-chloracrylic and methacrylic acids; methyl methacrylate, ethyl methacrylate, butyl methacrylate, octyl methacrylate, 2-nitro-2-methylpropyl methacrylate, methoxy-methacrylate, beta-chloroethyl methacrylate and the corresponding esters of acrylic and alpha-chloracrylic acids; vinyl chloride, vinyl fluoride, vinyl bromide; vinylidene chloride, 1-chloro-1-bromo-ethylene, vinylidene bromide, 1-fluoro-1-chlorethylene, 1,1-difluoroethylene; methacrylonitrile, alpha-chloracrylonitrile; acrylamide, methacrylamide, N,N-dimethylacrylamide, alpha-chloracrylamide or monoalkyl substitution products thereof; methyl vinyl ketone and methyl isopropyl ketone; vinyl carboxylates such as vinyl acetate, vinyl chloracetate, vinyl propionate and vinylstearate; N-vinylimides such as N-vinyl phthalimide and N-vinyl succinimide; methylene-malonic esters; itaconic acid and itaconic esters; trifluorethylene; N-vinyl carbazole and vinyl-substituted heterocyclic amines such as the vinylpyridines including those having hydrocarbon groups containing a total of not more than four carbon atoms attached to the pyridine nucleus, e. g., 2-vinyl-pyridine, 2-methyl-5-vinylpridine, vinyl imidazoles, e. g., 1-vinylimidazole and N-vinylimidazole, 1-vinyl-2-methylimidazole, etc.; vinyl furane; butyl vinyl sulfone, ethyl vinyl sulfone; ethylene, propylene, isobutylene, butene-1 and butene-2; alkyl vinyl ethers; vinyl sulfonic acid; ethylene-alpha, beta-dicarboxylic acid or their anhydrides or derivatives such as diethyl fumarate, diethyl maleate, diethyl citraconate, diethyl mesaconate; styrene, vinylnaphthalene and the like.

While the proportion of polymerized acrylonitrile in the base acrylonitrile polymer is at least 50%, it is frequently much higher depending on the ultimate use of the blend of polymer and thiourethane of cellulose ether. If the polymer is an acrylonitrile copolymer and the blend with the cellulose ether thiourethane is to be spun from a solution of the blend to form filaments or threads, the copolymer should contain at least 80% by weight of acrylonitrile in the molecule and not in excess of 20% by weight of the other monomer or monomers. Binary copolymers containing by weight in the polymer molecule from 80% to 99% acrylonitrile and 1% to 20% of another monomer, and ternary copolymers containing, by weight in the polymer molecule, 80% to 98% acrylonitrile and 1 to 19% each of two of the other monomers copolymerizable with acrylonitrile and in which the three components total 100%, are preferred for fiber-forming purposes.

The acrylonitrile polymers high in polymerized acrylonitrile content are soluble in dimethylformamide and dimethylacetamide. Since these solvents also dissolve the thiourethanes of cellulose ethers of the invention, they may be used in preparing spinning and casting solutions of the mixtures of acrylonitrile polymers and the thiourethanes.

The acrylonitrile polymers containing less than 80% by weight of acrylonitrile in the polymer molecule are not only soluble in dimethylformamide and dimethylacetamide but are also soluble in more common organic solvents, such as acetone, which do not dissolve the polymers of higher acrylonitrile content. Those thiourethanes of cellulose ethers which are soluble in acetone may be blended with the acetone-soluble acrylonitrile polymers and dissolved in acetone to obtain solutions which are cast into films, applied as coatings, and so forth.

The molecular weight of the thermoplastic resin mixed with the cellulose ether thiourethane may vary rather widely, depending on the use for which the blend or mixture is intended. Preferably, the resin has a molecular weight of at least 5,000, but when the composition comprises a blend of a cellulose ether thiourethane and a polymeric material containing at least 80% of polymerized acrylonitrile which is to be formed into filaments or yarns, higher molecular weights are required and the polymer may have a molecular weight up to 250,000 or even higher.

Although the cellulose ether thiourethanes of the invention can be blended with base materials which are more or less receptive to dyes, they are most valuable as blending or modifying agents for polymeric materials which are not dyed satisfactorily in baths containing the acetate dyes or wool type acid dyes, or which are not dyed satisfactorily by those dyes unless the bath contains special assistants the use of which complicates the dyeing operation and increases its cost.

The organic acid esters of cellulose, which are polymeric esters and exemplified by cellulose acetate, are hydrophobic materials not readily penetrated by water or aqueous media. The common method of dyeing articles formed from those esters with both acetate dyes and wool type acid dyes involves the use of baths containing an agent which swells or partially dissolves the cellulose ester to facilitate entry of the dyebath into the yarn or other article. Articles formed from blends of the cellulose organic acid esters with the thiourethanes of cellulose ethers of the invention can be dyed in aqueous baths containing the acetate dyes or acid wool type dyes in the absence of special swelling agents or partial solvents for the cellulose ester. Likewise, acrylonitrile polymers which do not accept the acid dyestuffs and are not colored to deep shades in baths containing the acetate dyes can be dyed under normal conditions in aqueous solutions or suspensions of those dyes if they are blended with the cellulose ether thiourethanes. In all cases, articles formed from blends of an acrylonitrile polymer and cellulose ether thiourethane were dyed to deeper, faster shades in aqueous baths containing a wool type acid dye or an acetate dye than control articles formed from the acrylonitrile polymer alone.

The dye receptivity of cellulose acetate and the thermoplastic resins can be modified by the use of the cellulose ether thiourethanes in amounts which do not result in any depreciation in the good tensile strength or other characteristic physical properties of filaments, yarns or other extruded or molded articles as compared to those properties of articles consisting of the cellulose esters or thermoplastic resins. In general, the cellulose ether thiourethane may be present in the blend in an amount of 2% to 25% on the weight of the blend.

The ethers and mixtures thereof with other at least initially thermoplastic materials exhibit good plastic flow during molding, and articles molded therefrom are clear, substantially colorless, and have a good surface appearance.

The following examples, in which the parts given are by weight unless otherwise specified, illustrate specific embodiments of the invention. The Rockwell hardness of the molded articles given was determined by means of the well-known Rockwell hardness tester.

*Example 1*

An aqueous alkaline solution of cellulose phenylthiourethane (prepared by the method described in my pending application Serial No. 65,742 now Patent No. 2,705,231) and containing 1 phenylthiourethane group per 3 anhydroglucose units was obtained by suspending 74 parts of the thiourethane in 3000 parts of water, mixing, and adding a mixture of 111 parts of sodium hydroxide dissolved in 515 parts of water. The mixture was chilled to room temperature and 378 parts of acrylonitrile were added. The mixture was stirred for six hours at 25° C. As the reaction proceeded, the product precipitated and on completion of the reaction the mixture was neutralized with acetic acid and filtered. The residue on the filter was washed four times with water at room temperature, with continuous agitation during the washings and filtration between each washing. The product was finally washed with water at 50° C. for four hours. The purified ether contained 8.7% nitrogen, equivalent to 1.5 cyanoethyl groups per anhydroglucose unit. It was soluble in acetone, dimethylformamide and dimethylacetamide.

*Example 2*

Weighed portions of the phenylthiourethane of cyanoethyl cellulose of Example 1 were placed in cylindrical compression molds having a diameter of 1.25 inch. The molds were placed in a hydraulic press and heated by band heaters to 210° C. and then subjected to 4000 lbs./sq. inch pressure for 5 minutes at that temperature. The molds were cooled and opened; the molded rods were removed. These rods were translucent, and had a Rockwell hardness of M–95.

*Example 3*

A 2% solution of an ethylthiourethane of cellulose having a degree of substitution of one ethylthiourethane group per 6.5 anhydroglucose units in 2% sodium hydroxide was made by suspending 87 parts of the thiourethane in 3,700 parts of water, mixing, and then adding a solution of 130.5 parts of sodium hydroxide in 432.5 parts of water. To this solution there were added, with stirring, 1166 parts of acrylonitrile and the reaction mixture was stirred at 25° C. for six hours, after which the mixture was neutralized with 95% acetic acid and filtered. The residue on the filter was washed four times with water at 25° C. with continuous agitation and with filtration between washings. It was finally washed with isopropanol at 50° C., filtered and dried at 50° C., for about three hours. The purified ether occurred as a white powder containing 9.40% combined nitrogen, corresponding to 1.62 cyanoethyl groups per anhydroglucose unit. The ether was analyzed for carboxyl content and found to contain 0.024% COOH, indicating very slight hydrolysis of the CN group. It was soluble in dimethylformamide and dimethylacetamide, insoluble in acetone and acetone-water mixtures.

*Example 4*

The ethylthiourethane of cyanoethyl cellulose of Example 3 was molded as in Example 1 at 215° C. Translucent rods having a Rockwell hardness of M–89 were obtained.

A standardized dyebath was prepared by dissolving 5% of Glaubers salt, 3% of sulfuric acid (96%) and 2% of the acid dye Wool Fast Scarlet G. Supra (C. I. #252) percentages on the weight of the article to be dyed in water. The articles to be dyed were entered into the bath at 55° C., the bath was brought to the boil in 10 minutes, and boiled for 20 minutes.

The rods of this example were dyed to a good red shade in the dyebath described.

Example 5

About 87 parts of cellulose dimethylthiourethane (prepared by the method of my pending application Serial No. 65,742 now Patent No. 2,705,231, and containing one dimethylthiourethane group per 2.6 anhydroglucose units) were suspended in 3,700 parts of water, the suspension was mixed, and 130.5 parts of sodium hydroxide in 432.5 parts of water were added. A 2% solution of the thiourethane in 2% sodium hydroxide was obtained. To this there were added, with stirring, 1166 parts of acrylonitrile. The reaction mixture was stirred at 25° C. for six hours, after which it was neutralized with 95% acetic acid and filtered. The residue on the filter was washed four times with water at room temperature, with continuous agitation during the washing and filtration between washings. It was finally washed with isopropanol at 50° C., filtered and dried at 50° C. The purified ether occurred as a white powder containing 7.39% combined nitrogen, corresponding to 1.1 cyanoethyl group per anhydroglucose unit.

Example 6

A solution of 2% of the phenylthiourethane of Example 1 in 1% aqueous sodium hydroxide was prepared by the method of Example 1. To 98.5 parts of this solution there were added 35 parts of acrylamide, and the mixture was stirred at 25° C. for six hours, after which it was poured into an aqueous solution of 10% acetic acid and 20% soduim acetate to precipitate the crude phenylthiourethane of amidoethyl cellulose. The precipitate was filtered and washed repeatedly with water until it was acid-free. It was then washed with isopropanol at 50° C. and dried. It contained 3.10% combined nitrogen, corresponding to 0.09 2-amidoethyl groups per anhydroglucose unit.

Example 7

A solution of 2% of the cellulose phenylthiourethane of Example 1 in 1% aqueous sodium hydroxide was obtained by the method of Example 1. To 98.5 parts of this solution there were added 50 parts of N,N-dimethylacrylamide. The reaction mixture was stirred at 25° C. for six hours, and then poured into an aqueous solution of 10% acetic acid and 20% of sodium acetate to precipitate the crude dimethylamidoethyl cellulose phenylthiourethane. The precipitate was filtered, washed with water until acid-free, finally washed with isopropanol at 50° C., and dried. It contained 2.81% combined nitrogen, equal to a degree of substitution of 0.06 2-dimethylamidoethyl groups per anhydroglucose unit.

Example 8

Viscose was prepared by impregnating 200 parts of cellulose in sheet form with 17.8% sodium hydroxide solution at 18° C. for two hours, pressing to three times the weight of the cellulose, shredding and mercerizing the cellulose for 72 hours at 18° C., xanthating the alkali cellulose with 85% carbon disulfide (on the weight of the cellulose) at between 18 and 25° C. for five hours, and then dissolving the xanthate in 3000 parts of water. The viscose thus obtained was aged for 24 hours at 10° C., and diluted with 8000 parts of water. 800 parts of a 5% (by volume) solution of acetic acid were added and the mass was stirred for one hour. A mixture of 200 parts chloracetic acid and 178 parts of sodium bicarbonate dissolved in 800 parts of water was slowly added and mixed for 24 hours at 25° C. At the end of this time, a solution of 400 parts of 2-aminopyridine in 200 parts of water was added. The mass was agitated at 25° C. for about 144 hours to precipitate the crude cellulose pyridylthiourethane. The precipitate was filtered, washed several times with water, once with isopropanol at 50° C., and again with water. The purified product was dried at 50° C. and 4 mm. pressure. It contained 3.65% combined nitrogen, corresponding to one pyridylthiourethane group per four anhydroglucose units.

290 parts of the pyridylthiourethane were dissolved in 8,688 parts of water containing 362 parts of sodium hydroxide. To this solution at 25° C. there were added 1350 parts of acrylonitrile. The mixture was stirred for six hours, after which it was neutralized with acetic acid and filtered. The residue was washed several times with 75% isopropanol with agitation during the washing and filtration between each washing. The purified product was dried. It contained 9.53% combined nitrogen, corresponding to a pyridylthiourethane of cyanoethyl cellulose containing 1.56 cyanoethyl groups per anhydroglucose unit.

Example 9

A solution of 2% of a cellulose phenylthiourethane containing one phenylthiourethane group per three anhydroglucose units in 1% aqueous sodium hydroxide was prepared by the method of Example 1. About 140 parts of acrylonitrile were added to 985 parts of the alkaline solution and the mixture was stirred at 25° C. After 15 minutes, two hours, and six hours, portions of the mixture were poured into an aqueous solution of 10% acetic acid and 15% sodium acetate. The precipitates obtained were washed repeatedly with water, finally with isopropanol at 50° C. The product obtained after the 15-minute reaction period was insoluble in dimethylacetamide, while the products obtained after the two-hour and six-hour reaction periods were soluble therein. The phenylthiourethane of cyanoethyl cellulose obtained after a reaction time of two hours contained 6.96% combined nitrogen, corresponding to a ratio of cyanoethyl groups to anhydroglucose units of 0.93:1.

Example 10

A solution of 2% of the cellulose phenylthiourethane of Example 1 in aqueous 1% sodium hydroxide was prepared by the method of Example 1, and heated at 35° C. with 280 parts of acrylonitrile for six hours. The reaction product was isolated and purified as in Example 9. It contained 8.70% combined nitrogen, corresponding to 1.45 cyanoethyl groups per anhydroglucose unit. It was soluble in dimethylformamide, dimethylacetamide and acetone.

Example 11

Example 10 was repeated, except that the reaction temperature was 45° C. The ether thus produced contained 7.09% combined nitrogen which corresponds to a degree of substitution of 0.96 cyanoethyl group per anhydroglucose unit.

Example 12

Example 10 was repeated, using 56 parts of acrylonitrile. The resulting purified ether contained 6.31% nitrogen, corresponding to 0.75 cyanoethyl group per anhydroglucose unit.

Example 13

Example 10 was repeated, using 140 parts of acrylonitrile. The purified phenylthiourethane of the cyanoethyl ether contained 6.63% nitrogen, which corresponds to 0.85 cyanoethyl group per anhydroglucose unit.

Example 14

A solution of 2% of the phenylthiourethane of cellulose in aqueous 3% sodium hydroxide was prepared by the method of Example 1. To 985 parts of the solution there were added 146 parts of acrylonitrile. The mixture was stirred for six hours at 25° C. The cyanoethyl ether was precipitated and purified as in Example 9. By analysis it was found to contain 7.57% combined nitrogen, corresponding to a cyanoethyl group to anhydroglucose unit ratio of 1:1.

Example 15

A solution of 2% of the cellulose phenylthiourethane in 4% aqueous sodium hydroxide was made by the method of Example 1. 146 parts of acrylonitrile were added to 985 parts of the solution and the mixture was stirred for six hours at 25° C. The cyanoethyl ether was precipitated and purified as in Example 9. On analysis it was found to contain 6.91% combined nitrogen which corresponds to a D. S. (degree of substitution) of 0.92 cyanoethyl group per anhydroglucose unit.

*Example 16*

About 14 parts of a blend of 88 parts of a copolymer of 97% acrylonitrile and 3% vinyl acetate (sp. visc. 0.26), with 12 parts of the ethylthiourethane of cyanoethyl cellulose of Example 3 was dissolved in 86 parts of dimethylacetamide. The 14% solution was pumped at a speed of 12 ml./min. through a spinneret having 40 holes into a bath comprising 60% of dimethylacetamide and 40% of water at 50° C. The yarns thus formed were withdrawn from the bath after an immersion of 18 inches, withdrawn over a godet at a speed of 25 ft./min. and washed with water at 95° C. as they passed from the bath to the godet. The yarns were given a godet stretch of 150%, washed with water at 95° C. until the residual dimethylacetamide content was less than 2%, dried on steam-heated rolls at 100° C., and stretched 350% in an atmosphere of steam under a pressure of 60 lbs./sq. in.

The yarns could be dyed by cellulose acetate dyestuffs. In an aqueous bath containing 6% Celliton Fast Violet Ba (Pr. #240) (ratio of bath to yarns 40:1) in which the yarns were held for one hour at 200° F., they dyed to a deeper shade than control yarns of the 97% acrylonitrile-3% vinyl acetate copolymer produced and aftertreated in the same manner. In a bath containing 6% Celliton Fast Black BTNA and under the same dyeing conditions, the yarns of the blend were dyed to a deeper shade than the control yarns.

*Example 17*

A 16% dimethylacetamide solution of a blend of 88 parts of a copolymer of 97% acrylonitrile and 3% vinyl acetate with 12 parts of the dimethylthiourethane of cyanoethyl cellulose of Example 5 was prepared. The solution was spun into yarns as in Example 16, except that the yarns were withdrawn from the bath at a speed of 32 ft./min. and stretched 100% simultaneously with washing thereof as they proceeded from the bath.

Different aqueous dyebaths were prepared containing 10% of sulfuric acid and, respectively, the acid dyestuffs as follows: 2% Crocein Scarlet MOO, 2% Acid Dark Green, A (C. I. No. 247), and 6% Wool Navy Blue 2B. Different batches of the yarns comprising the blend of acrylonitrile polymer and the dimethylthiourethane of cyanoethylcellulose were entered into the baths at 200° F. and held therein for one hour. Ratio of bath to yarns 40:1.

Different aqueous dyebaths were prepared containing, respectively, the following cellulose acetate dyestuffs: 2% Eastone Orange 3R, 4% Eastman Blue, BNN, 4% Celliton Fast Violet BA (Pr. #240), and 6% Celliton Fast Blue BRA (Br. #233). Different batches of the yarns comprising the blend as described above were dyed in these baths at 200° F. for one hour. Ratio of bath to yarns 40:1.

*Example 18*

A 14% dimethylacetamide solution of a blend of 92 parts of a copolymer of 97% acrylonitrile and 3% vinyl acetate (specific viscosity 0.22 measured as 0.1 gm. in 100 ml. of dimethylformamide) and 8 parts of the pyridylthiourethane of cyanoethyl cellulose of Example 8 was prepared. The solution was cast to a film which was dyed with Wool Fast Scarlet G Supra in a bath prepared as described in Example 4. The dye acceptance of the blend film was considerably better than that of a control film of the acrylonitrile-vinyl acetate copolymer.

*Example 19*

A 14% dimethylacetamide solution of a blend of 92 parts of polyacrylonitrile and 8 parts of the pyridylthiourethane of cyanoethyl cellulose of Example 8 was prepared. It was cast to films which were dyed to a deeper shade of red in a bath as in Example 18 than a control film of the copolymer.

Various modifications may be made in practicing the invention. For instance in Example 6, instead of acrylamide there may be used an acrylamide salt, such as the sulfate.

Other modifications and changes may also be made without departing from the spirit and scope of the invention as defined in the appended claims.

I claim:

1. As a new compound, a thiourethane of an ether of cellulose, said compound having the formula

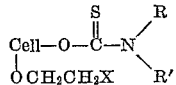

in which cell is the cellulose molecule, X is selected from the class consisting of CN groups and CONYY' groups in which Y and Y' are each selected from the group consisting of hydrogen and alkyl radicals containing from 1 to 3 carbon atoms, and R and R' are each selected from the group consisting of hydrogen, saturated and unsaturated aliphatic hydrocarbon radicals containing from 1 to 8 carbon atoms, alicyclic radicals having a single 4- to 6-membered carbocyclic ring, heterocyclic nitrogen radicals having a single 5- to 6-membered ring, aryl radicals of the benzene series containing no hydrocarbon group attached to the benzene ring, and aryl radicals of the benzene series having hydrocarbon groups containing a total of not more than two carbon atoms attached to the benzene ring.

2. The phenylthiourethane of 2-cyanoethyl cellulose.
3. The ethylthiourethane of 2-cyanoethyl cellulose.
4. The dimethylthiourethane of 2-cyanoethyl cellulose.
5. The pyridylthiourethane of 2-cyanoetheyl cellulose.
6. The benzylthiourethane of 2-cyanoethyl cellulose.
7. A process of producing a cyanoethylated cellulose thiourethane which comprises reacting a thiourethane of cellulose with acrylonitrile in a ratio of from 1 mole of the thiourethane to 10 to 55 moles of acrylonitrile in an aqueous solution of from 1 to 4% of alkali metal hydroxide and at a temperature of 15 to 45° C. for between 2 to 8 hours.
8. Process of claim 7 in which the thiourethane group is selected from the group consisting of thiourethane, phenylthiourethane, phenylethylthiourethane, isopropylthiourethane, amylthiourethane, benzylthiourethane, cyclohexylthiourethane, octylthiourethane, dibenzylthiourethane, dibutylthiourethane, diethylthiourethane, methallylthiourethane, pyrrolylthiourethane, and cyclobutylthiourethane.

References Cited in the file of this patent

UNITED STATES PATENTS

| | | |
|---|---|---|
| 1,674,402 | Lilienfeld | June 19, 1928 |
| 1,906,910 | Lilienfeld | May 2, 1933 |
| 1,938,033 | Lilienfeld | Dec. 5, 1933 |
| 2,211,327 | Gordon | Aug. 13, 1940 |
| 2,230,967 | Straughn | Feb. 4, 1941 |
| 2,284,896 | Hanford et al. | June 2, 1942 |
| 2,486,971 | Ohlmann | Nov. 1, 1949 |
| 2,499,501 | Hollihan | Mar. 7, 1950 |
| 2,564,735 | Stockwell | Aug. 21, 1951 |

OTHER REFERENCES

Fieser et al.: Organic Chemistry, 2d ed., Heath, page 32.

Whitmore: Organic Chemistry, 2d ed., pages 727–8 and 741–2.